April 14, 1970             E. PLAVÉN            3,506,485
APPARATUS FOR EXTRACTING STARCH AND GLUTEN
FROM A DOUGH OF WHEAT FLOUR
Filed July 30, 1965                          3 Sheets-Sheet 2
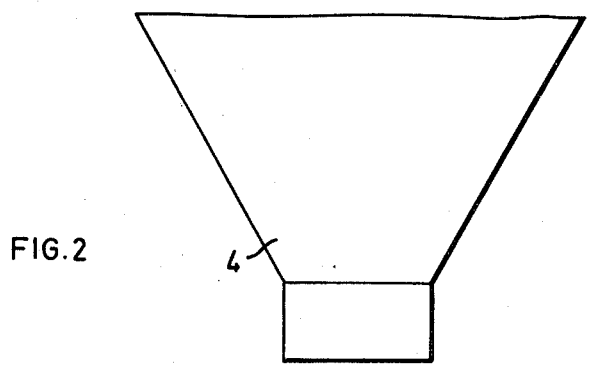
FIG.2
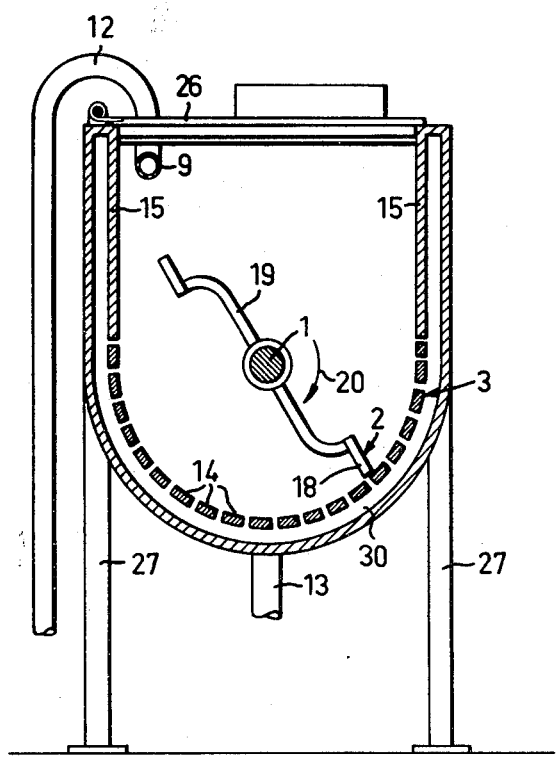
Erik Plavén,
Inventor
By Wenderoth, Lind and Ponack,
Attorneys

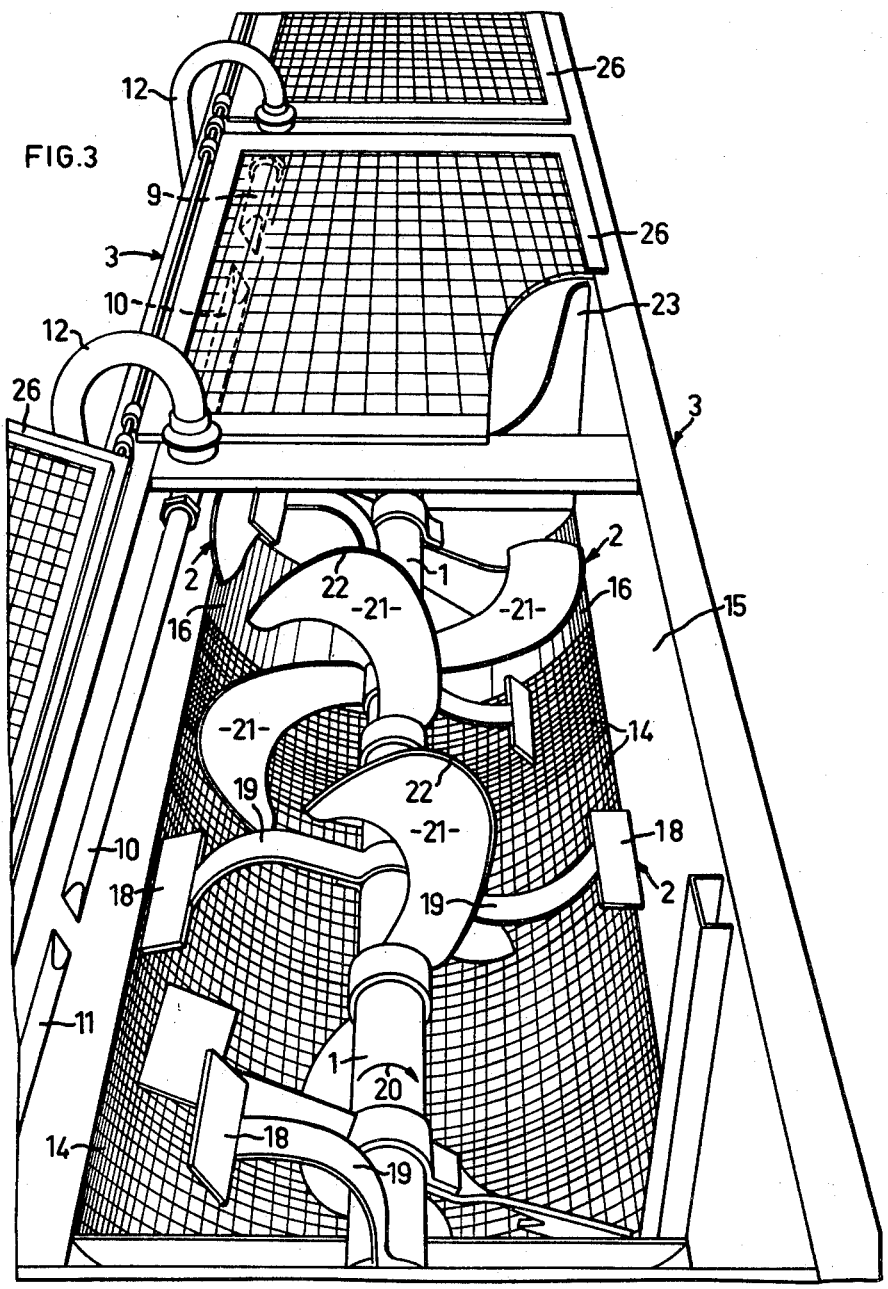

United States Patent Office 3,506,485
Patented Apr. 14, 1970

3,506,485
APPARATUS FOR EXTRACTING STARCH AND
GLUTEN FROM A DOUGH OF WHEAT FLOUR
Erik Plavén, Scheelegatan 1,
Stockholm, Sweden
Filed July 30, 1965, Ser. No. 476,128
Claims priority, application Sweden, Aug. 4, 1964,
9,412/64
Int. Cl. B03b 3/00, 11/00; C13l 1/00
U.S. Cl. 127—25                                          7 Claims

ABSTRACT OF THE DISCLOSURE

An apparatus for separating starch from gluten in a wheat flour dough comprising means for collecting the gluten in a treating zone, said means repeatedly catching and pushing the gluten in the zone, lifting the lumps of collected gluten out of the zone, and dropping the lumps of gluten back to the treatment zone in an optionally repeated series.

---

This invention relates to a process and apparatus for extracting starch and gluten from a dough of wheat flour and water in which the dough is treated with a wash liquid which catches the starch and carries it out of the treatment zone and in which the gluten forms into lumps, and more particularly to the apparatus for carrying out this process of the type consisting of a trough having a semicircular, at least partly perforated bottom, treatment means fastened to a rotating shaft arranged lengthwise in the trough, and devices for the addition of wash water and discharge of this water together with extracted starch via the perforations, the dough being introduced at one end of the trough and the gluten being discharged at the other end. In the methods and apparatus as hitherto known for extracting starch and gluten from a dough of wheat flour it has been necessary to use a high-quality flour, but in spite of the high flour quality it has not been possible to obtain a high yield and quality of the products without incorporating a lengthy and labour consuming and thus rather costly treatment. The extraction process suggested by the present invention makes it possible to reduce the treatment time considerably also when using a low-grade flour, whereby labour is required for supervision only. The process according to the invention is characterized by the steps of collecting the gluten by catching and pushing it through the treatment zone, whereby small gluten particles or gluten lumps present in the zone and not caught stick to and are absorbed by the gluten or gluten lumps pushed through the treatment zone, and causing the wash liquid added to discharge from the treatment zone without forming any noticeable liquor level.

The apparatus for carrying out the process outlined above is characterized by the fact that the treatment means are in the form of stirring rods or scrapers and that the trough is perforated substantially throughout the extension of the sections, where the trough is concentric with the shaft of the scrapers and thus broadly parallel with the paths of rotation of the rods and the scrapers, all in order that the scrapers during their rotation in the trough and around the shaft may catch gluten and gluten lumps and carry them through the trough in the transverse direction thereof, and may lift the gluten lumps out of the trough at one side thereof and let them fall back into the trough at the other side thereof, and that water supplied to the trough may be discharged through the perforations without causing any essential water accumulation in the trough.

The invention is described below, reference being made to the accompanying drawings in which:

FIG. 2 shows a cross section of the trough.

FIG. 3 shows a perspective view from above of the greater part of the trough.

Figure 1:
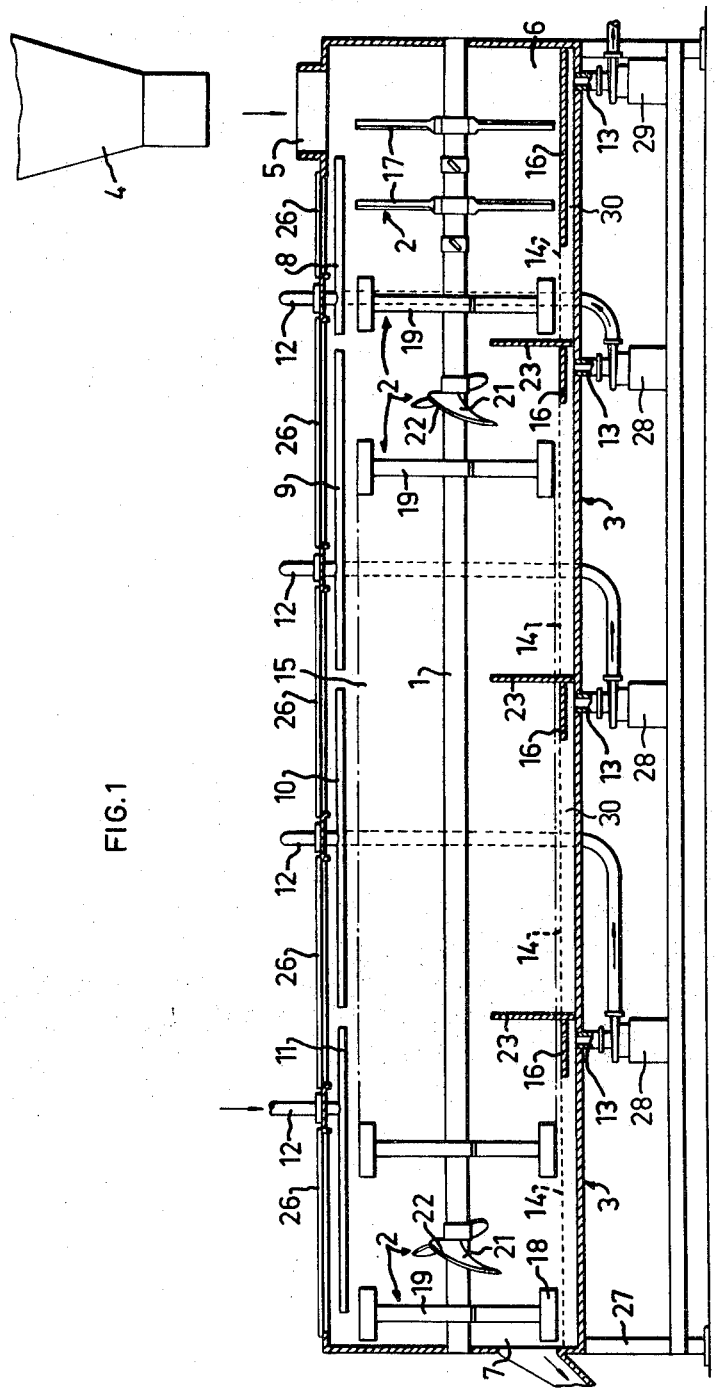
FIG. 1 shows a longitudinal section of a trough according to the invention.

The rotating main shaft 1 of the apparatus, shown in the drawings, for extracting starch and gluten by treatment of dough with liquid has treatment means, generally designated 2, fastened to it for working and transporting the dough crosswise and lengthwise along the wholly or partly perforated bottom of the trough 3. For forming the dough, wheat flour is mixed with water and worked to a plastic but still firm dough, which thereafter, possibly after a certain swelling time in a tank 4, is introduced through an opening 5 into the supply end 6 of the trough. The gluten separated off from the dough during the treatment in the trough 3 is discharged through the discharge end 7 of the trough. During the treatment or washing in the trough 3 the dough is sprayed with water or so-called starch milk, i.e. water which has already been used one or more times for washing the dough in the trough 3 or possibly in following washing devices. This liquid is introduced through spray pipes 8, 9, 10 and 11 into the top part of the trough. The liquid is fed to the spray pipes 8–11 through pipes 12 and pump means 28 incorporated with said pipes 12. The wash liquid with suspended starch is discharged from the trough 3 via collectors 30 through pipes 13 and pump means 29 incorporated with said pipes 13 to devices (not shown) for separating starch from the wash liquid. The pipe 13 from the trough section sprayed by the spray pipe 11 may be connected to the spray pipe 10, and the pipe 13 from the trough section sprayed by the spray pipe 10 may be connected to the spray pipe 9 etc. By this arrangement the amount of water needed is reduced and the small gluten particles, possibly passed through the perforation and carried by the wash liquid, are returned to the treatment compartment of the trough 3. The use of starch milk in this way as wash liquid has not previously been possible in the earlier stages of the dough washing process especially not when low-grade flour has been used.

The trough 3 is perforated practically throughout the length of the sections 14, which are concentric with the shaft 1 and thus mainly in parallel with the path of rotation of the treatment means 2. The treatment means 2 are in the form of rods or scraper blades with the ends or edges turned towards the sections 14. The trough 3, with the exception of its very beginning at the feed end where it should suitably be imperforate, is perforated substantially throughout its length but only in sections 14 mentioned where the trough is concentric with the shaft 1. In other words: the vertical sides 15 of the trough 3 as shown in the figures are imperforate, as on these vertical sections perforations would not affect the treatment at all. As the shaft 1 and thus also the treatment means 2 always rotate in the same direction, the treatment will mainly take place in that part of the trough where the treatment means 2 move from their lowest point and upwards. Consequently, the perforations might be limited to only this section of the trough. Further, for the utilization of the invention the trough 3 need not be perforated in its full length between the feed end 6 and the discharge end 7, but it may be suitable to let perforated sections 14 alternate with imperforate sections 16 as shown in the figures.

The treatment means 2 are somewhat different in shape for securing the best possible treatment of the dough and the gluten from which more or less strach has been separated. Common to all treatment means 2 is, however, that they project close to the semicircular parts of the sections 14 and 16. At the feed end 6 of the trough 3, where the trough is imperforate, the main task of the treatment means 2 is to tear and divide the dough, to stir it and to make it possible for the wash water to reach the dough on as large contact surfaces as possible in order to flush off the starch. Therefore, at the feed end 6 the treatment means 2 have the shape of stirring rods 17 fixed radially to the shaft 1. In the perforated sections 14 of the trough 3 the treatment means 2 are in the shape of scrapers or transfer means 18, the blades of which are mainly parallel with and radial to the shaft 1. The length of the blades in their extension parallel with the shaft 1 corresponds mainly to the extension of the section 14 in the same direction. For practical reasons several scrapers are arranged along the shaft to cover the full length of the extension of the perforated section parallel with the shaft. In their rotation in the direction shown by the arrow 20 in FIG. 3 the scrapers 18 catch gluten lumps and push them along the curve of the perforated plate and lift them until they fall down back onto the trough bottom. During the treatment the gluten lumps are caught several times by the scrapers 18, lifted and returned to the bottom of the trough 3, simultaneously also being slowly conveyed towards the discharge end 7 of the trough 3 due to the scraper blades not being fully parallel with the shaft 1. When the gluten lumps are pushed along the curve of the perforated plates, they absorb gluten particles which are too small to be caught by the scraper blades and such particles as are sticking in the perforations. Through this action the perforations are kept open so that the wash liquid can discharge without accumulating in the treatment area. It is very important that the wash liquid should be drained off continuously from the perforated plate, for if the gluten lumps pushed along the curve of the screen plate are submerged in water, they will not have sufficient absorption power to catch and merge with the small gluten particles sticking in the perforations or suspended in the wash liquid.

The action of absorbing the gluten particles sticking in the perforations is further increased by the gluten lumps being pressed against the perforated plate by the scraper blades. When leaving the feed end 6 of the trough the dough is still greasy due to its starch content and wet surface, and here it is even more important that scraper blades keep the perforations open, and therefore such scrapers 18 have to be fastened to the shaft 1 also where stirring rods are fastened. The scrapers are suitably arranged in an angle of about 90° to the nearest stirring rods so as not to interfere with the stirring and tearing action of the stirring rods. The scrapers 18 are very important for a troublefree function of the device. The scrapers 18 are connected to the shaft 1 by means of connecting rods 19 bent to the form of an arc where all parts of the arc are situated in front of the scraper blade 18 in relation to the direction of rotation shown by the arrow 20. This shape of the connecting rods prevents the gluten lumps from sliding along the rods down to the shaft 1 and twisting around the shaft and makes them fall off between the shaft 1 and the trough sides.

Sabre-like treatment means 21 are also fastened to the shaft 1. The edge 22 of the sabres 21 is facing the semi-circular bottom of the trough and runs at an angle to the shaft 1, the main planes of the sabres forming an acute angle to the curve of the bottom of the trough 3. The sabres 21 may be fitted both in the perforated sections 14 and the imperforate sections 16. The mode of operation of the sabres 21 is entirely different from that of the scrapers 18, in that the sabres pinch the gluten lumps between the edge and trough bottom 14 and 16, thus shredding the gluten lumps so that the lumps are opened and better exposed to the wash liquid, the result being that starch granules embedded in the lumps are uncovered and can be washed away from the gluten. The combined action of the scrapers 18 and the sabres 21 increases the efficiency of the treatment of the gluten and the dough. Tests have proved that this combined action of the scrapers 18 and the sabres 21, each with a different mode of operation, is of the utmost importance to the utilization of the invention. As the sabres 21 cut large gluten lumps into smaller pieces, the lumps are reduced to a size suitable for the treatment in the trough. It is of advantage if the treatment means 18 and 21 are adjustable along the shaft 1 as well as at an angle in relation to each other.

The trough 3 is divided into compartments by means of dividing walls 23 over which the gluten lumps are lifted by means of the treatment means. The trough may be covered with lids 26 and mounted on legs 27.

The principle of the invention is not confined only to what is described above, but may be embodied in various forms within the scope of the appended claims.

What I claim and desire to secure by Letters Patent is:

1. Apparatus for washing treatment of a wheat flour dough to effect separation of starch from the gluten thereof while exposed to a washing liquid, said apparatus comprising in combination:
   (a) an elongated treatment tank having inlet means and outlet means at opposite ends thereof, and having lower walls, and opposite side and end walls;
   (b) said tank further comprising an elongated upwardly open trough fabricated with a generally semi-circular lower wall having an imperforate portion opposite said inlet means of the tank, and said trough being at least partially well perforated throughout the rest of its length to the outlet means of said tank;
   (c) means supporting said trough in spaced relation inwardly above the tank's lower walls;
   (d) a rotatable shaft extending lengthwise of and within said trough and means rotatably supporting same in the end walls of said tank;
   (e) said shaft having a plurality of axially and successively alternately spaced, different forms of treatment means extending radially from said shaft and extending closely adjacent to the semi-circular portions of said trough, said treatment means serving to repeatedly stir-and-tear the dough into lumps, scrape and collect, and shred and flatten the lumps of dough while moving it through the tank from the inlet into the outlet thereof, said treatment means including:
      (1) a first plurality of stirring-and-cutting means for the initial tearing of the dough into lumps, and disposed on said shaft near the inlet end of said tank;
      (2) a second plurality of axially spaced scraping-and-collecting paddle means of a form substantially different from said first stirring-and-cutting means, said second plurality of means disposed on said shaft commencing beyond said first plurality means and extending thereafter in an axially spaced manner throughout the remaining length to the outlet end of said tank to repeatedly scrape, lift and collect said dough lumps; said paddle means including a generally planar blade portion having their outer edges facing to substantially engage essentially with perforated portions of said trough to perform as aforesaid; and
      (3) a third plurality of dough-shredding-and-flattening means including multi-armed, arcuate, sabre-like members attached to the shaft at interspersed intervals with said second plurality means above; and
   (f) pipe means associated with said tank for introducing wash liquid to the interior thereof, and including elongated pipe means throughout an upper portion of the tank, said elongated pipe means including outlets to direct a substantial wash spray toward said dough being treated throughout said tank.

2. Apparatus as defined in claim 1 further including means for collecting, draining and positively discharging the wash liquid from said tank to preclude undesirable buildup thereof within said tank and trough.

3. Apparatus as defined in claim 1 wherein the said first plurality of stirring-and-cutting means includes diametrically opposed radial arms or blades, with the planes of said blades being angularly pitched relative to the axis of said shaft, and said blades being alternately disposed at 90° intervals with respect to the corresponding blades of the adjacently spaced ones.

4. Apparatus as defined in claim 1 wherein radial arms for supporting said paddles are arcuately curved and disposed rotationally in front of said paddle scraping blades in relation to its direction of rotation, said arcuate arms and disposition thereof thereby preventing lumps of gluten and dough from sliding down said arms and entangling around the rotating shaft, thereby making said lumps or dough fall off and drop between the shaft and trough side walls.

5. Apparatus as defined in claim 1 wherein the trough is provided with predetermined axially spaced imperforate sections interrupting the perforated portions.

6. Apparatus as defined in claim 1 wherein the trough is provided with predetermined axially spaced imperforate sections interrupting the perforated portions, and said trough including relatively low arcuate, radial partition means disposed adjacent the aforesaid imperforate sections along the lower portion of said trough to divide said trough into predetermined zones, and including means for collecting, draining and positively discharging the wash liquid from said tank to preclude undesirable buildup thereof within said tank and trough.

7. Apparatus as defined in claim 1 wherein said members of the third plurality means each include triple circumferentially spaced planar arms having arcuate outer peripheral edges of which a substantial part of said edge essentially engages closely adjacent the lower trough walls to repeatedly shred, spread or flatten and otherwise break up the lumps to facilitate the separation of starch from the gluten thereof; and the triple arms of each of said members having the plane thereof disposed at respectively different angles to each other in a general propellor fashion to help collect and convey said dough lumps through said tank toward the outlet end thereof.

References Cited

UNITED STATES PATENTS

| | | | |
|---|---|---|---|
| 517,363 | 3/1894 | Scharar | 209—283 |
| 650,495 | 5/1900 | Spencer | 209—464 |
| 676,645 | 6/1901 | Arnold | 209—283 |
| 1,083,128 | 12/1913 | Paatz | 127—25 |
| 1,798,811 | 3/1931 | Riemann | 127—25 |
| 2,216,371 | 10/1940 | Leveke | 209—464 |
| 2,336,991 | 12/1943 | Leveke | 209—464 |
| 2,388,902 | 11/1945 | Callaghan et al. | 127—67 |
| 2,555,908 | 6/1951 | Edeskuty et al. | 127—25 |

MORRIS O. WOLK, Primary Examiner

S. MARANTZ, Assistant Examiner

U.S. Cl. X.R.

209—464